US008274396B2

(12) United States Patent
Gurley et al.

(10) Patent No.: US 8,274,396 B2
(45) Date of Patent: Sep. 25, 2012

(54) LOCAL POSITIONING SYSTEMS AND METHODS

(75) Inventors: Jason Gurley, Madison, AL (US); John White, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 409 days.

(21) Appl. No.: 12/539,404

(22) Filed: Aug. 11, 2009

(65) Prior Publication Data

US 2010/0033339 A1    Feb. 11, 2010

Related U.S. Application Data

(60) Provisional application No. 61/087,887, filed on Aug. 11, 2008.

(51) Int. Cl.
*G08B 21/00* (2006.01)
(52) U.S. Cl. ............... 340/686.1; 340/572.1; 340/10.1; 340/572.4
(58) Field of Classification Search .............. 340/686.1, 340/572.1
See application file for complete search history.

(56) References Cited

U.S. PATENT DOCUMENTS

| | | | |
|---|---|---|---|
| 5,504,477 | A | 4/1996 | Whitright et al. |
| 6,512,478 | B1 * | 1/2003 | Chien ............... 342/357.25 |
| 7,259,718 | B2 | 8/2007 | Patterson et al. |
| 7,538,679 | B2 * | 5/2009 | Shanks ............... 340/572.1 |
| 2007/0285245 | A1 * | 12/2007 | Djuric et al. ............... 340/572.1 |
| 2008/0143482 | A1 * | 6/2008 | Shoarinejad et al. ........ 340/10.1 |
| 2009/0212921 | A1 * | 8/2009 | Wild et al. ................... 340/10.5 |

OTHER PUBLICATIONS

Welch, et al., "SCAAT: Incremental Tracking with Incomplete Information," University of North Carolina at Chapel Hill.
Peter S. Maybeck, "Stochastic models, estimation, and control," vol. 1 Department of Electrical Engineering, Air Force Institute of Technology, Wright-Patterson Air Force Base, Ohio, 1979.
Welch, et al., "An Introduction to the Kalman Filter," Course 8, University of North Carolina at Chapel Hill, Department of Computer Science, 2001.

* cited by examiner

*Primary Examiner* — George Bugg
*Assistant Examiner* — Kerri McNally
(74) *Attorney, Agent, or Firm* — Maynard, Cooper & Gale, P.C.; Jon E. Holland

(57) ABSTRACT

A local positioning system uses at least one node to track a location of a mobile tag. The system measures flight times of signals communicated between the node and the tag to determine values indicative of the range of the tag from the node. If desired, the values may be filtered in an effort to increase the accuracy of the range estimation. As an example, a Kalman filtering algorithm may be used. Multiple antennas are used at both the node and the tag to provide more accurate range estimates and to determine when the tag is entering a dead zone where signals are blocked or attenuated by obstacles.

27 Claims, 8 Drawing Sheets

LOCAL POSITIONING SYSTEMS AND METHODS

RELATED ART

This application claims priority to U.S. Provisional Patent Application No. 61/087,887, entitled "Local Positioning Systems and Methods," and filed on Aug. 11, 2008, which is incorporated herein by reference.

RELATED ART

Local positioning systems can be used to track objects or personnel. In general, a local positioning system has a plurality of nodes. One of the nodes, referred to herein as the "tag," is attached to an object, such as a collar of a monitored pet, and each of the other nodes determines a respective distance of the tag from the node. Based on such distances, the location of the tag relative to the other nodes can be determined using known techniques, such as triangulation or trilateration.

Various types of ranging techniques can be used to determine a distance of a node from the tag. For example, according to one method, a node transmits a signal to the tag, which responds by transmitting a reply signal to the node. The time required to transmit a signal and to receive a reply is measured, and based on such measurement, the time-of-flight between the node and tag can be determined. Using the time-of-flight, the distance between the node and the tag can be calculated.

Unfortunately, many conventional ranging techniques are plagued by performance issues that significantly affect the ranging accuracy and, hence, the accuracy of any local positioning system that may utilize such techniques. For example, Nanotron Technologies sells an integrated circuit (IC) chips for ranging applications. For example, the Nanoloc™ chip sold by Nanotron Technologies is configured to determine the distance from another Nanoloc™ chip based on the time-of-flight between the two chips. However, the accuracy of the Nanoloc™ chip is generally around ±1 meter (m) for outdoor applications and around ±2 m for indoor applications. Considering that each position sample within a positioning system can be based on multiple ranges, the error for a position sample within a positioning system employing the Nanoloc™ chip may be much greater than 1 or 2 meters.

Moreover, techniques for reducing the error and improving performance of local positioning systems are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
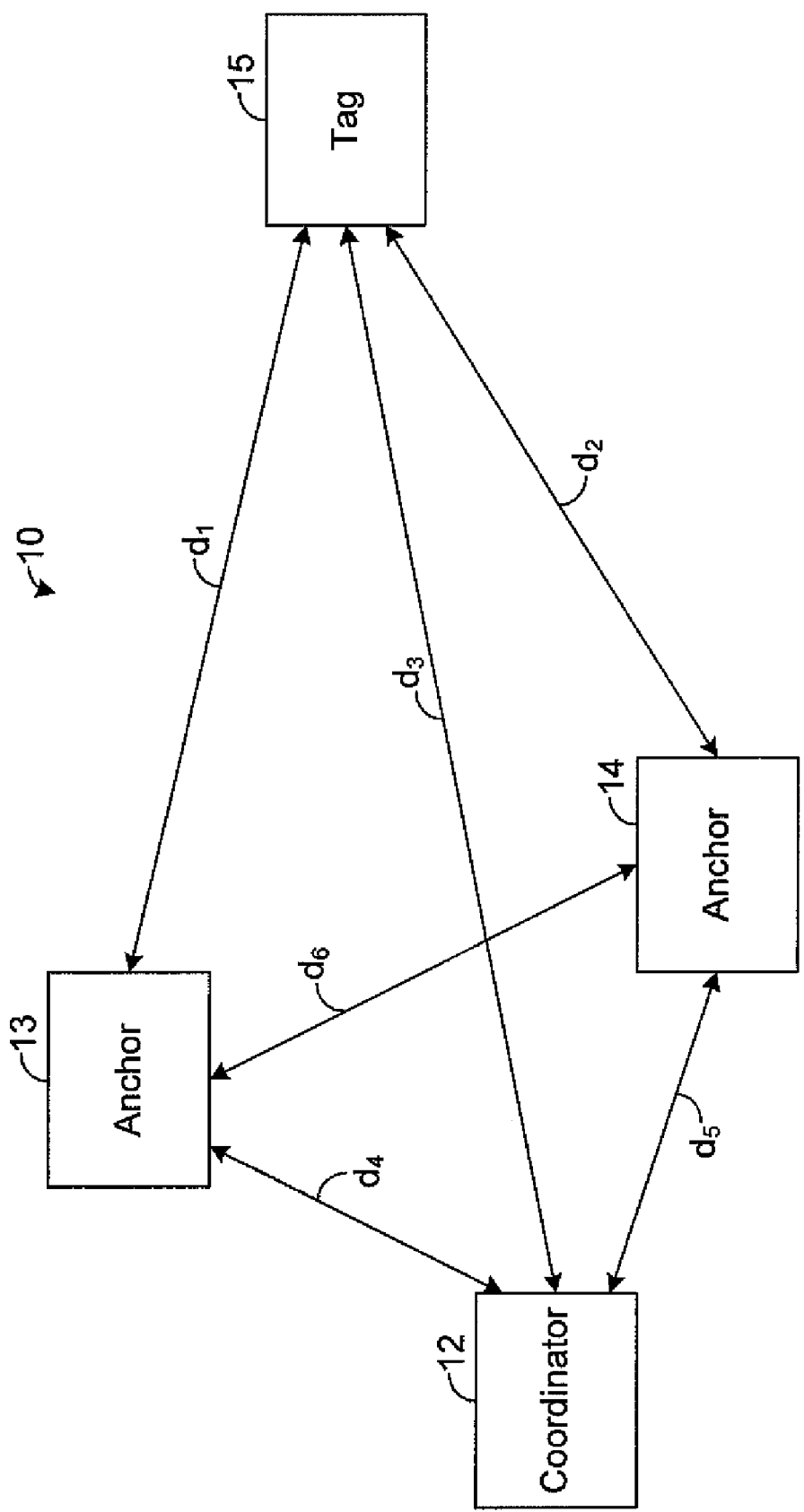
FIG. 1 is a block diagram illustrating an exemplary embodiment of a local positioning system.

The present disclosure generally pertains to local positioning systems and methods for tracking objects and personnel. FIG. 1 depicts a local positioning system 10 in accordance with an exemplary embodiment of the present disclosure. The system 10 has a plurality of nodes 12-15. In one exemplary embodiment, as shown by FIG. 1, the system 10 has four nodes 12-15, but other numbers of nodes 12-15 are possible in other embodiments.

One of the nodes 12 is referred to herein as the "coordinator," and two of the nodes 13, 14 are referred to herein as "anchors." In one exemplary embodiment, the nodes 12-14 are stationary with respect to each other. For example, each of the nodes 12-14 may be mounted in the same building or vehicle. However, it is possible for the nodes 12-14 to move relative to each other provided that the relative positions of the nodes 12-14 can be determined.

One of the nodes 15 is referred to herein as the "tag." The tag 15 is coupled to an object or person that moves relative to the other nodes 12-14. As will be described in more detail hereafter, the coordinator 12 and anchors 13, 14 are configured to track the position of the tag 15. In one exemplary embodiment, trilateration is used to track the tag 15, but other techniques, such as triangulation, for example, may be used if desired.

In one exemplary embodiment, the anchor 13 is configured to determine a distance $d_1$ from the tag 15 to the anchor 13, and the anchor 14 is configured to determine a distance $d_2$ from the tag 15 and the anchor 14. Also, the coordinator 12 is configured to determine a distance $d_3$ from the tag 15 to the coordinator 12. Based on such distances $d_1$, $d_2$, $d_3$, the coordinator 12 is configured to use trilateration to determine a position of the tag 15. In one exemplary embodiment, the coordinator 12 is coupled to an output device, such as a display or a printer, which is used to display information about the tag's position 15. In addition, the tag's position may be monitored to control various actions based on such position.

Since the tag 15 is movable relative to the nodes 12-14, it is preferable for the communication between the tag 15 and the nodes 12-14 to be wireless. In one exemplary embodiment, radio frequency (RF) signals are communicated between the tag 15 and the other nodes 12-14. The anchors 13, 14 may be coupled to the coordinator 12 via physical media, such as conductive wires for enabling communication between the coordinator 12 and the anchors 13, 14. In one exemplary embodiment, wireless signals, such as RF signals, are communicated between the coordinator 12 and the anchors 13, 14.

The system 10 takes a sample, referred to herein as a "position sample," from time-to-time. Each position sample represents of a measurement of the tag's current position by the local positioning system 10. In one exemplary embodiment, the position samples are periodic, such as every 100 milliseconds (ms). In other embodiments, other time periods may be used. Also, it is possible for position samples to occur on demand or otherwise be non-periodic.

For each position sample, each of the anchors 13, 14 and the coordinator 12 measures the range of the tag 15 from the respective anchor 13, 14 or coordinator 12. In this regard, the anchor 13 measures the distance $d_1$ of the tag 15 from the anchor 13 and provides a value, referred herein as a "range value," indicative of such distance. The anchor 13 also transmits its calculated range value to the coordinator 12. The anchor 14 measures the distance $d_2$ of the tag 15 from the anchor 14 and provides a value, referred to herein as a "range value," indicative of such distance. The anchor 14 also transmits its calculated range value to the coordinator 12. Further, the coordinator 12 measures the distance $d_3$ of the tag 15 from the coordinator 12 and provides a value, referred to herein as a "range value," indicative of such distance. Based on the range values calculated by the coordinator 12 and the anchors 13, 14, the coordinator 12 calculates a position sample indicative of the tag's position using any known trilateration or other type of position determination algorithm.

To enhance the accuracy of the range values, each range value is based on multiple distance measurements, which are filtered. There are various types of techniques that may be used to determine the range values. Exemplary techniques for determining a range value will now be described in more detail below with particular reference to the techniques used by anchor 13. The other anchor 14 and the coordinator 12 may use similar techniques to determine their respective range values.

Figure 2:
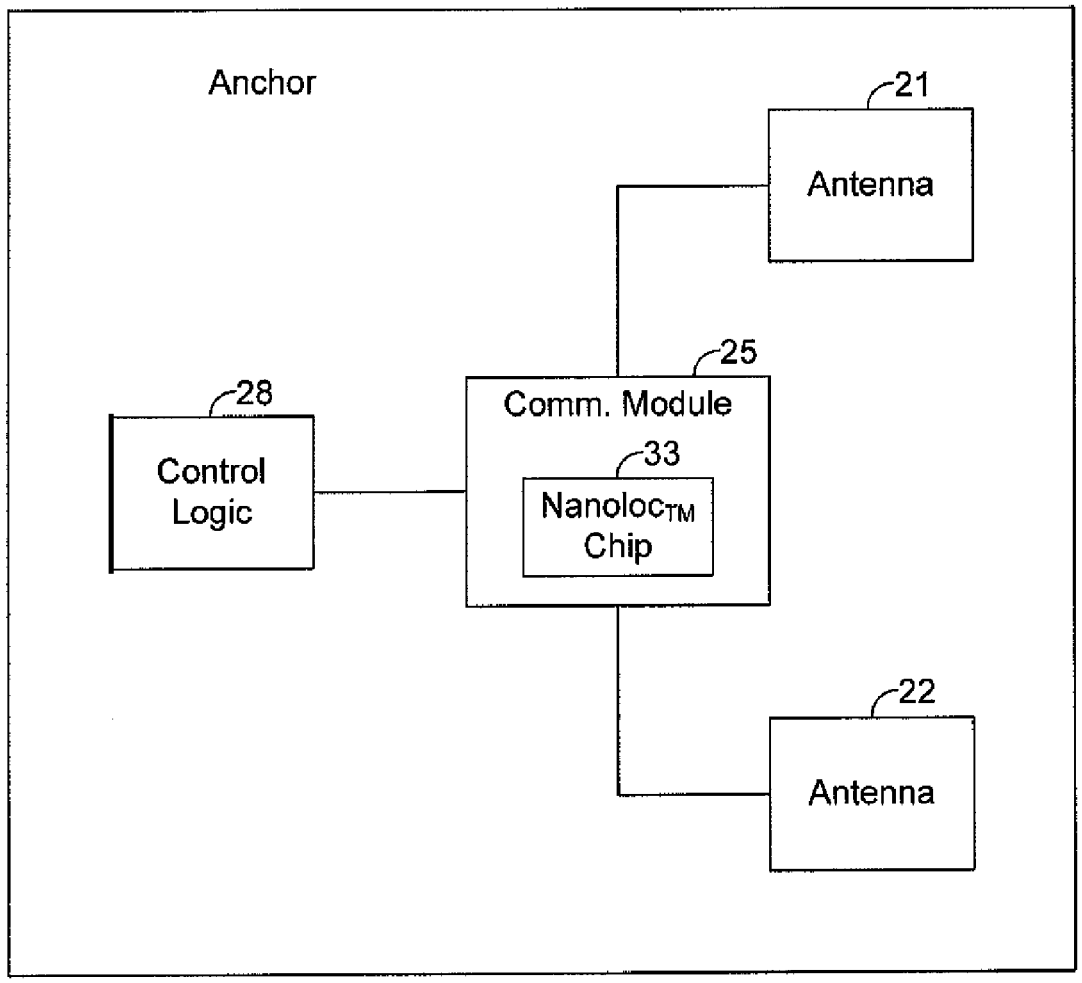
FIG. 2 is a block diagram illustrating an exemplary embodiment of an anchor, such as is depicted by FIG. 1.

FIG. 2 depicts an exemplary embodiment of the anchor 13. As shown by FIG. 2, the anchor 13 comprises two antennas 21, 22 that are conductively coupled to a communication module 25, although other numbers of antennas may be employed in other embodiments. Further, control logic 28 generally controls the operation of the anchor 13, as will be described in more detail hereafter. The control logic 28 and the communication module 25 may be implemented in hardware, software, or any combination thereof. If any portion of the control logic 28 or the communication module 25 is implemented in software, then the anchor 13 comprises a processing element, such as digital signal processor (DSP) or central processing unit (CPU), for executing the instructions of the software.

In one exemplary embodiment, the communication module 25 is configured to measure the distance of the anchor 13 from other components, such as the coordinator 12, the other anchor 14, and the tag 15, via wireless signals transmitted via at least one antenna 21, 22. Various types of devices may be used to implement the module 25. In one exemplary embodiment, the communication module 25 comprises an integrated circuit (IC) chip 33, referred to as Nanoloc™ sold by Nanotron Technologies. In other embodiments, the communication module 25 may comprise other types of devices for measuring distance.

Figure 3:
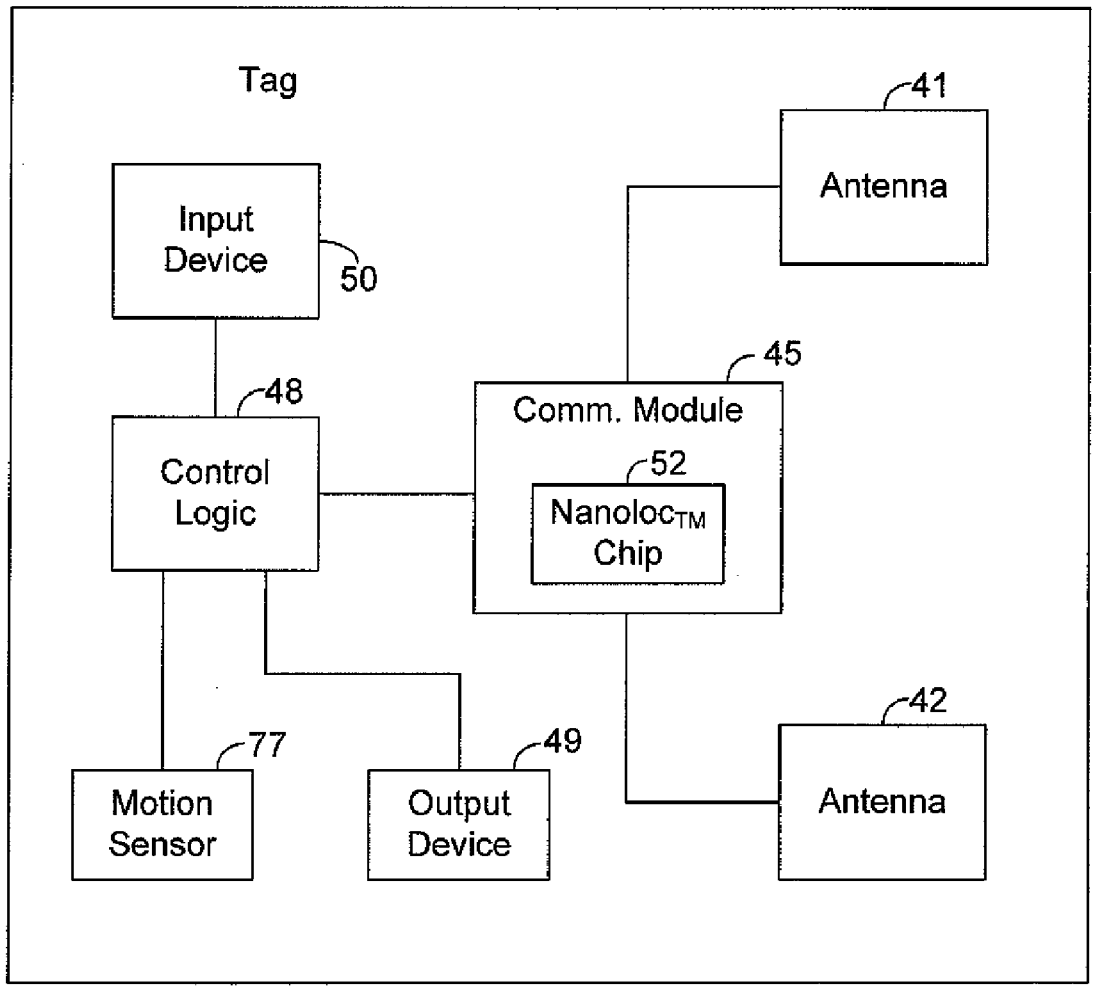
FIG. 3 is a block diagram illustrating an exemplary embodiment of a tag, such as is depicted by FIG. 1.

Further, as shown by FIG. 3, the tag 15 similarly comprises a plurality of antennas 41, 42, a communication module 45, and control logic 48. The tag 15 also comprises an output device 49 and an input device 50. The output device 49 may comprise a speaker (not shown) for emitting sounds, a display device, such as a liquid crystal display (LCD), a printer, a light source, such as a light emitting diode (LED), or other device for providing user outputs. The output device 49 may also comprise a data interface for enabling the tag 15 to transmit information with other electrical components. The input device 50 may comprise a user input interface, such as a switch or keypad, for enabling a user to provide inputs. The input device 50 may also comprise a data interface for enabling the tag 15 to receive data from other electrical components. Note that any data interface may be bi-directional to allow both transmission and reception of data via the same interface.

The communication module 45 of the tag 15, like the communication module 25 of the anchor 13, comprises a Nanoloc™ chip 52. Any Nanoloc™ chip enables data communication and ranging with another Nanoloc™ chip. In one exemplary embodiment, the anchor 13 makes a distance measurement for $d_1$ using the ranging functionality provided by the Nanoloc™ chips 33, 52 of the anchor 13 and the tag 15.

In this regard, for each distance measurement, the Nanoloc™ chip 33 of the anchor 13 transmits a signal to the Nanoloc™ chip 52 of the tag 15. In response, the Nanoloc™ chip 52 of the tag 15 transmits a reply signal. The Nanoloc™ chip 33 of the anchor 13 determines the time-of-flight for the signals communicated between the anchor 13 and the tag 15, and based on the time-of-flight determines the distance $d_1$. For the same distance measurement, the Nanoloc™ chip 52 of the tag 15 similarly transmits a signal to which the Nanoloc™ chip 33 of the anchor 13 replies, and the Nanoloc™ chip 52 of the tag 15 determines the time-of-flight for such signals. The Nanoloc™ chip 52 of the tag 15 also transmits a value indicative of the time-of-flight to the anchor 13. Based on such value, the Nanoloc™ chip 33 of the anchor 13 calculates the distance $d_1$ and averages the distance $d_1$ that is based on the time-of-flight measured by the anchor 13 and the distance $d_1$ that is based on the time-of-flight measured by the Nanoloc™ chip 52 of the tag 15. The Nanoloc™ chip 33 of the anchor 13 then outputs this averaged value, which will be referred to hereafter as a "distance measurement value."

Note that the exemplary embodiment described above utilizes Nanoloc™ chips 32, 52 for determining range information. In other embodiments, other types of components and other algorithms for determining range information are possible.

The control logic 28 of the anchor 13 implements a filter that, over time, filters multiple distance measurement values from the communication module 25 to provide a filtered value, referred to hereafter as the "filter estimate," which is iteratively updated as the communication module 25 provides new distance measurement values. In the instant embodiment, this filter estimate provided by the control logic 28 represents the range value that is transmitted to the coordinator 12 for determining a position sample. In this regard, in one exemplary embodiment in which a position sample is taken periodically every 100 milliseconds (ms), the filter estimate, which is iteratively updated over time, is transmitted to the coordinator 12 every 100 ms as the range value for the current position sample. Thus, each range value transmitted by the anchor 13 is based on a plurality of filtered distance measurement values thereby improving the accuracy of the range value and, hence, the resulting position sample.

Various types of filtering algorithms may be employed to filter the distance measurement values. In one exemplary embodiment, the control logic 28 implements a Kalman filter. The theory of the Kalman filter and filtering techniques that can be used by the control logic 28 are described in more detail in U.S. Provisional Patent Application No. 61/087,887, which is incorporated herein by reference. In general, a Kalman filter, as defined by Wikipedia, is "a recursive filter that estimates the state of a linear dynamic system from a series of noisy measurements." The Kalman filtering algorithm receives a series of measurement samples and combines the samples to provide a current estimate of the parameter being measured. Further, the algorithm weights each sample depending on the confidence for the measurement sample. That is, generally, samples estimated to have a high degree of accuracy are given more weight or, in other words, have a greater influence over the filter estimate provided by the algorithm.

In one exemplary embodiment, the control logic 28 uses the Kalman filtering algorithm to estimate the current range value for the tag 15. Further, the algorithm is simplified by assuming that the velocity of the tag 15 is zero. The algorithm associates each sample (i.e., distance measurement value in the instant example) with two parameters: a process noise covariance value (PNCV) and a measurement noise covariance value (MNCV). The PNCV is a parameter of the Kalman filtering algorithm indicative of the amount of process noise estimated for the associated sample, and the MNCV is a parameter of the Kalman filtering algorithm indicating the amount of measurement noise estimated for the associated sample. In general, a higher PNCV indicates that a higher amount of process noise is estimated, and the confidence for the associated sample is, therefore, lower. A higher MNCV indicates that a higher amount of measurement noise is estimated, and the confidence for the associated sample is, therefore, lower.

For illustrative purposes, assume hereafter that the distance measurement values input into the Kalman filtering algorithm and the filter estimate output by such algorithm are in meters (m), although other measurement units may be used in other embodiments.

In one exemplary embodiment, the PNCV is assigned a constant value of 0.1 for all samples, although the PNCV may be varied and/or assigned other values in other embodiments. In addition, the MNCV is variable based on a comparison of the distance measurement value for the current distance measurement sample and the last estimated position or range of the tag 15.

There are various techniques that can be used to select the MNCV for the current distance measurement sample. In one exemplary embodiment, the control logic 28 compares the current distance measurement sample to the filter estimate, which was calculated by the algorithm for the previous distance measurement sample. For example, in one embodiment, the control logic 28 subtracts the distance measurement of the current sample from the filter estimate and then compares the absolute value of the difference to at least one threshold. The control logic 28 then determines the MNCV based on such comparison. In one exemplary embodiment in which the sample is expressed in meters, the control logic 28 compares the difference to a threshold of 4.0 and assigns the MNCV a value of 4.0 if the absolute value of the difference is equal to or greater than the threshold. If the absolute value of the difference is less than the threshold, then the control logic 28 assigns the MNCV a value of 0.1. Thus, the current distance measurement sample is associated with an MNCV value of 4.0 if the absolute value of the difference between the distance measurement value for the sample and the filter estimate (which represents the estimated range value calculated for the previous distance measurement sample) is equal to or greater than 4.0 m. However, the current distance measurement value of the distance measurement sample is associated with an MNCV value of 0.1 if the difference between the distance measurement value for the current sample and the filter estimate is less than 4.0 m. In other embodiments, other values for the MNCV, PNCV, and/or the threshold(s) used to determine the MNCV are possible. In addition, it is possible for the MNCV to be based on other parameters and for the PNCV to vary, if desired.

The current distance measurement value, the MNCV associated with the current distance measurement value, and the constant PNCV are input to the Kalman filtering algorithm for the current distance measurement sample. In this regard, the control logic 28, based on the associated MNCV and the constant PNCV, combines the distance measurement value of the current sample with the filter estimate and calculates a new filter estimate, which represents the range value (indicating the estimated distance between the anchor 13 and the tag 15). This filter estimate will then be compared with the distance measurement value of the next distance measurement sample to determine the MNCV associated with this next sample, as described above.

It should be emphasized that the techniques described above for implementing the Kalman filter to estimate the distance between nodes are exemplary. Various modifications to the techniques would be apparent to one of ordinary skill upon reading this disclosure. In addition, other filtering algorithms may be used, and it is possible for the range to be estimated without filtering.

Figure 4:
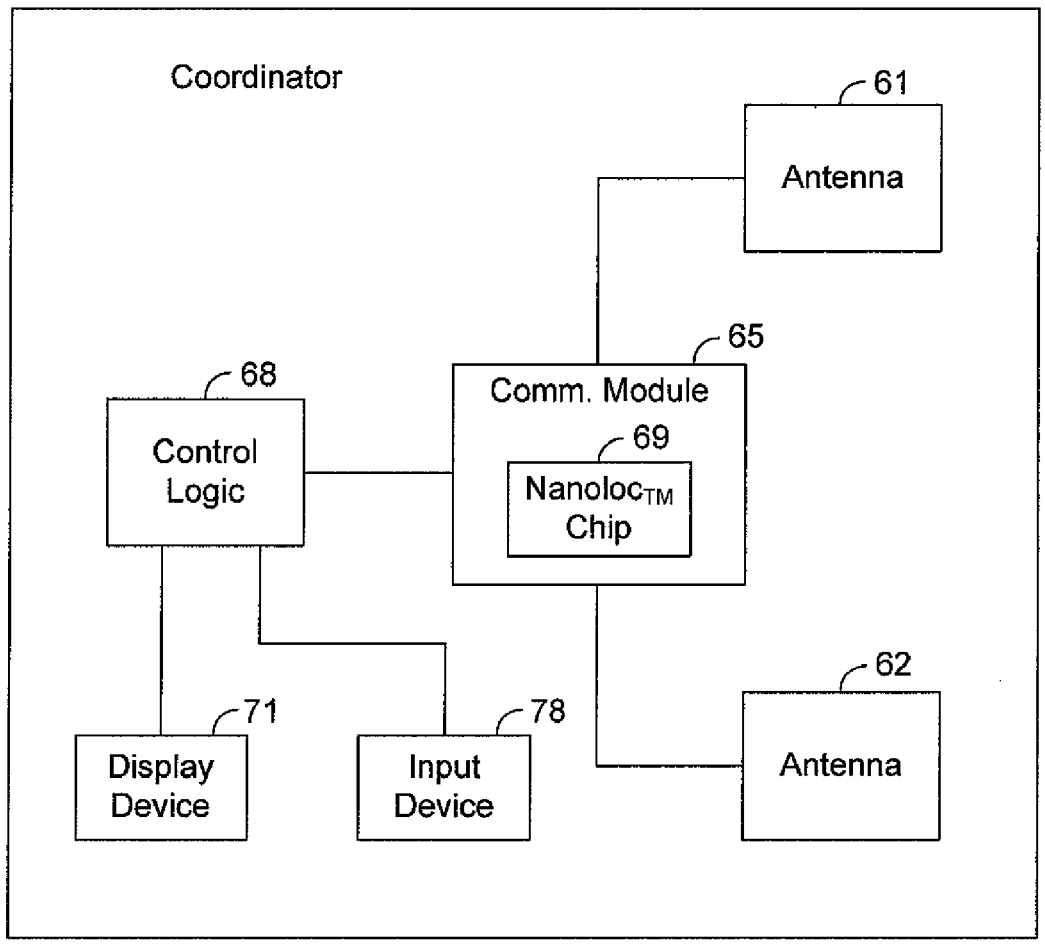
FIG. 4 is a block diagram illustrating an exemplary embodiment of a coordinator, such as is depicted by FIG. 1.

In one exemplary embodiment, the configuration of the anchor 14 is similar or identical to that of the anchor 13, and the anchor 14 determines a range value indicating the distance $d_2$ from the tag 15 according to the same techniques described herein for the anchor 13 in determining a range value indicating the distance $d_1$. In addition, as shown by FIG. 4, the coordinator 12, similar to the anchor 13, comprises a plurality of antennas 61, 62, a communication module 65, and control logic 68. The communication module 65, like the communication module 25 of the anchor 13, comprises a Nanoloc™ chip 69, and the coordinator 12 determines a range value indicating the distance $d_3$ from the tag 15 according to the same techniques used by the anchor 13 to determine a range value indicating the distance $d_1$. Further, for each position sample, the control logic 68 of the coordinator 12, using a trilateration or other position determining algorithm, calculates a value, referred to hereafter as a "position value," based on the current range values measured by the coordinator 12 and anchors 13, 14. The control logic 68 is configured to display the position value or information based on the position value via a display device 71, such as a liquid crystal display (LCD), or other type of output device.

Note that the control logic 48 and the communication module 45 of the tag 15, as well as the control logic 68 and the communication modules of the coordinator 12, may be implemented in hardware, software, or any combination thereof. Further, the tag 15 and/or coordinator 12 may include a processing element, such as digital signal processor (DSP) or central processing unit (CPU), for executing the instructions of any component implemented in software.

As described above, the control logic 28 of the anchor 13 maintains a filter estimate, which is updated based on distance measurement values from the communication module 25 and which is transmitted from time-to-time to the coordinator 12 as a range value for a given position sample. In one exemplary embodiment, the control logic 28 is configured to update the filter estimate based on a sensed motion of the tag 15. For example, in one exemplary embodiment, as shown by FIG. 3, the tag comprises a motion sensor 77, such as an accelerometer or other device for sensing movement. When the sensor 77 detects movement (e.g., acceleration), the tag 15 transmits a notification of such sensed movement. In response to the notification, the control logic 68 updates the filter estimate being maintained at the anchor 13.

For example, the control logic 28 may re-initialize the filter estimate or parameters used in the calculation of the filter estimate such that the distance measurement values determined prior to the sensed motion have no effect or a reduced effect on the current filter estimate. In this regard, the sensed motion indicates that the position of the tag 15 has likely changed and, therefore, previous distance measurement values are less likely to accurately indicate the tag's current position. Thus, the filter estimate is appropriately updated to account for this event. Note that there are various ways that the filter estimate and/or filtering algorithm can be updated to account for sensed movement of the tag 15. In one exemplary embodiment, the parameters used to calculate the filter estimate are adjusted in response to a movement detection by the sensor 77. For example, assume that the motion sensor 77 is an accelerometer. In response to a determination that the measured acceleration exceeds a predefined threshold, the filter may be re-initialized such that the filter estimate is independent of any of the distance measurement values measured prior to such re-initialization. Various other actions are possible in response to a movement detection. Further, the anchor 14 and the coordinator 12 are preferably configured to similarly update their respective filter estimates in response to a movement detection by the sensor 77.

In one exemplary embodiment, the position of the tag 15 is expressed in (x, y) coordinates. It is possible for the (x, y) coordinates to be predefined. In one exemplary embodiment, the coordinator 12 is configured to dynamically define an (x, y) coordinate system and to determine the location of the anchors 13, 14 within such coordinate system. In this regard, during an initialization phase that occurs before an operational phase in which the position of the tag 15 is determined, the coordinator 12 is configured to determine the distance $d_4$ from the coordinator 12 to the anchor 13 and the distance $d_5$ form the coordinator 12 to the anchor 14. Techniques described above for determining distances $d_1, d_2, d_3$ from the tag 15 may be used to determine the foregoing distances $d_4, d_5$ between the coordinator 12 and the anchors 13, 14. In addition, one of the anchors 13, 14 determines the distance between the two anchors 13, 14 and transmits a value indicative of such distance $d_6$ to the coordinator 12. Techniques described above for determining distances $d_1, d_2, d_3$ from the tag 15 may be used to determine the foregoing distance $d_6$ between the anchors 13, 14. Other techniques for determining the distances $d_4, d_5,$ and $d_6$ are possible. For example, a user may determine such distances and enter them via an input device 78 (FIG. 4), such as a keyboard or mouse, of the coordinator 12 or otherwise.

The coordinator 12 assumes that it is at the origin of the coordinate system and that one of the anchors 13, 14 is along the x-axis of the coordinate system. The coordinator 12 also assumes a direction for the y-axis, which is orthogonal to the x-axis. Based on such assumptions, the coordinator 12 calculates the (x, y) coordinates of the anchors 13, 14. Thereafter, using trilateration or other positioning techniques and the coordinates of the coordinator 12 and anchors 13, 14, as well as the range values determined by the coordinator 12 and anchors 13, 14, the coordinator 12 determines the (x, y) coordinates of the tag 15. Note that the techniques described above for defining a coordinate system and determining the positions of the system components within the coordinate system are exemplary, and other techniques may be employed in other embodiments.

If the coordinator 12 and the anchors 13, 14 communicate at different frequencies, then communication (such as ranging) with the tag 15 can be simultaneous. However, if any of the coordinator 12 and anchors 13, 14 communicate at the same frequency, then it may be desirable to take actions in an effort to reduce or eliminate interference. For example, in one embodiment, the coordinator 12 controls when the anchors 13, 14, poll the tag 15 for determining measurement value. In addition, the coordinator 12 prevents each of the anchors 13, 14 from communicating at the same time that any of the coordinator 12 and the other anchor 13, 14 is communicating. Accordingly, at any given time, only one of the coordinator 12 and the anchors 13, 14 is allowed to communicate with the tag 15. In other embodiments, other configurations are possible.

In one exemplary embodiment, the coordinator 12 is configured to perform filtering thereby obviating the need or desire to perform filtering at the anchors 13, 14. For example, in one embodiment, distance measurement values from the anchors 13, 14 are transmitted to the coordinator 12, which then filters the values to determine the range values to be used for determining the position of the tag 15. Such a configuration may help to reduce the overall cost of the system 10. In this regard, filtering algorithms can be computationally expensive relative to other types of actions performed by the system 10. Pushing the filtering to the coordinator 12 may enable the anchors 13, 14 to be manufactured with less expensive components and/or components having lower processing power or speed. For example, in one embodiment, the coordinator 12 comprises a personal computer (PC) or other high-speed data processing device for performing the filtering described above. Employing a fast processing device at the anchors 13, 14, however, may be unnecessary helping to keep the cost of the anchors 13, 14 relatively low.

In one exemplary embodiment, each node 12-15 has two antennas and selectively switches between the antennas in an effort to reduce constructive and destructive interference. In this regard, as described above, each range value used for a given position sample has been filtered by iteratively updating the range value with newly calculated distance measurement values. For example, as described above, the anchor 13 determines a distance measurement value based on a time-of-flight measured by the anchor 13 and a time-of-flight measured by the tag 15, and a filtering algorithm then uses the distance measurement value to iteratively update a filter estimate that is periodically used to perform a position sample. In one exemplary embodiment, for each iteration of the filtering algorithm, the control logic 28 of the anchor 13 selects between multiple distance measurement values and provides only the selected distance measurement value for filtering while discarding the other distance measurement value.

For example, for each iteration of the filtering algorithm in one exemplary embodiment, the communication module 28 determines a distance measurement value using signals communicated via antenna 21. Then, the communication module 25 repeats the process using signals communicated via antenna 22 rather than antenna 21 to provide another distance measurement value. The control logic 28 compares the two distance measurement values and selects the lowest. If the control logic 28 performs the filtering, the control logic 28 updates the filter estimate (which represents the range value in one embodiment) using the lowest of the two distance measurement values. If another component, such as the coordinator 12, performs the filtering, the control logic 28 transmits the lowest of the two distance measurement values to the other component to be used for filtering. In either case, the control logic 28 discards the non-selected value (i.e., the highest of the two distance measurement values). In other embodiments, the control logic 28 may select among other numbers of distance measurements values for any iteration of the filtering algorithm for any sample.

Note that it is unlikely that constructive and destructive interference will equally affect communication occurring via antenna 21 relative to the communication occurring via antenna 22. By selecting among distance measurement values based on communication via different antennas 21, 22, as described above, better spatial diversity is achieved likely resulting in a more accurate range value. In one exemplary embodiment, communication among the nodes 12-15 is within an 80 Mega-Hertz bandwidth centered at 2.4417 Giga-Hertz, and the center-to-center distance between antennas 21, 22 is 47 millimeters. In other embodiments, other frequencies and other distances between the antennas may be used. In general, it is desirable for the antennas to be spaced a distance 21, 22 that is not a multiple of the half wavelength of the signals being communicated by the antennas 21, 22. The anchor 14 and the coordinator 12 may be identically or similarly configured to select among distance measurement values from various antennas, as described above for the anchor 13. In addition, the foregoing embodiment uses two antennas 21, 22 at the anchor 13, but in other embodiments, any number of antennas may be similarly used.

Various embodiments of the local positioning system 10 described above generally have three nodes 12-14 that track a mobile tag 15. However, any number of nodes may be used to track the tag 15 in other embodiments. For example, if desired, a single node may be used to track the tag 15. An exemplary embodiment using a single node to track the tag 15 will be described in more detail below.

Figure 5:
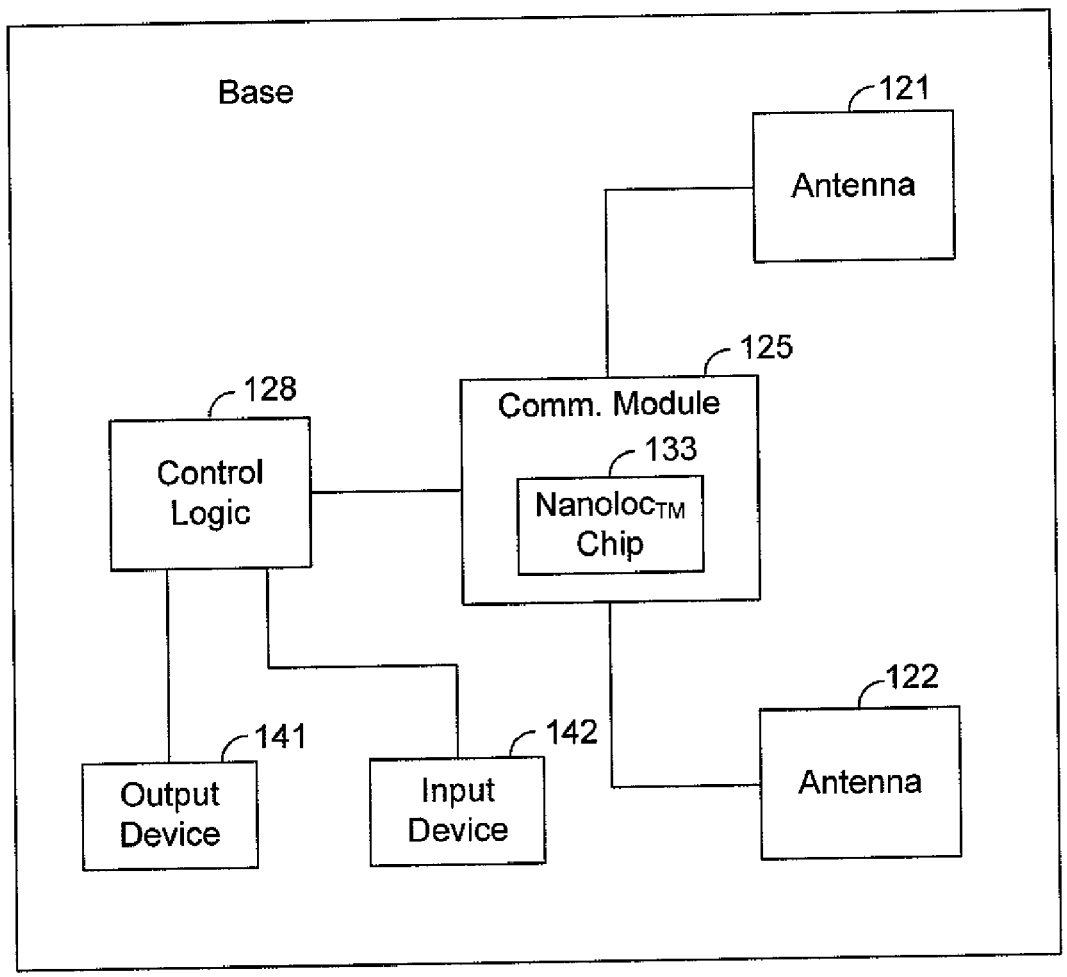
FIG. 5 is a block diagram illustrating an exemplary embodiment of a base that may be used to estimate a range between the base and a tag, such as is depicted by FIG. 3.

In this regard, FIG. 5 depicts an exemplary node 112, referred to herein as a "base," for tracking the tag 15. Like the other nodes 12-14 described above, the base 112 comprises two antennas 121, 122 that are conductively coupled to a communication module 125, although other numbers of antennas may be employed in other embodiments. Further, control logic 128 generally controls the operation of the base 112, as will be described in more detail hereafter.

In one exemplary embodiment, the communication module 125 is configured to measure the distance between the base 112 and the tag 15 via wireless signals transmitted via at least one antenna 121, 122. Various types of devices may be used to implement the module 125. In one exemplary embodiment, the communication module 125 comprises an integrated circuit (IC) chip 133, referred to as Nanoloc™ sold by Nanotron Technologies. In other embodiments, the communication module 125 may comprise other types of components for measuring distance.

As shown by FIG. 5, the base 112 comprises an output device 141, such as a liquid crystal display (LCD), other type of display device, or a printer, for outputting data to a user. The base 112 also comprises an input device 142, such as a keyboard or mouse, for enabling a user to provide inputs.

It should be noted that the control logic 128 and the communication module 125 can be implemented in software, hardware, or any combination thereof. In an exemplary embodiment illustrated in FIG. 6, the control logic 128 is implemented in software and stored in memory 152. In one exemplary embodiment, the base 112 is implemented via a computer system, such as a personal computer (PC), but other implementations of the base 112 are possible in other embodiments.

Figure 6:
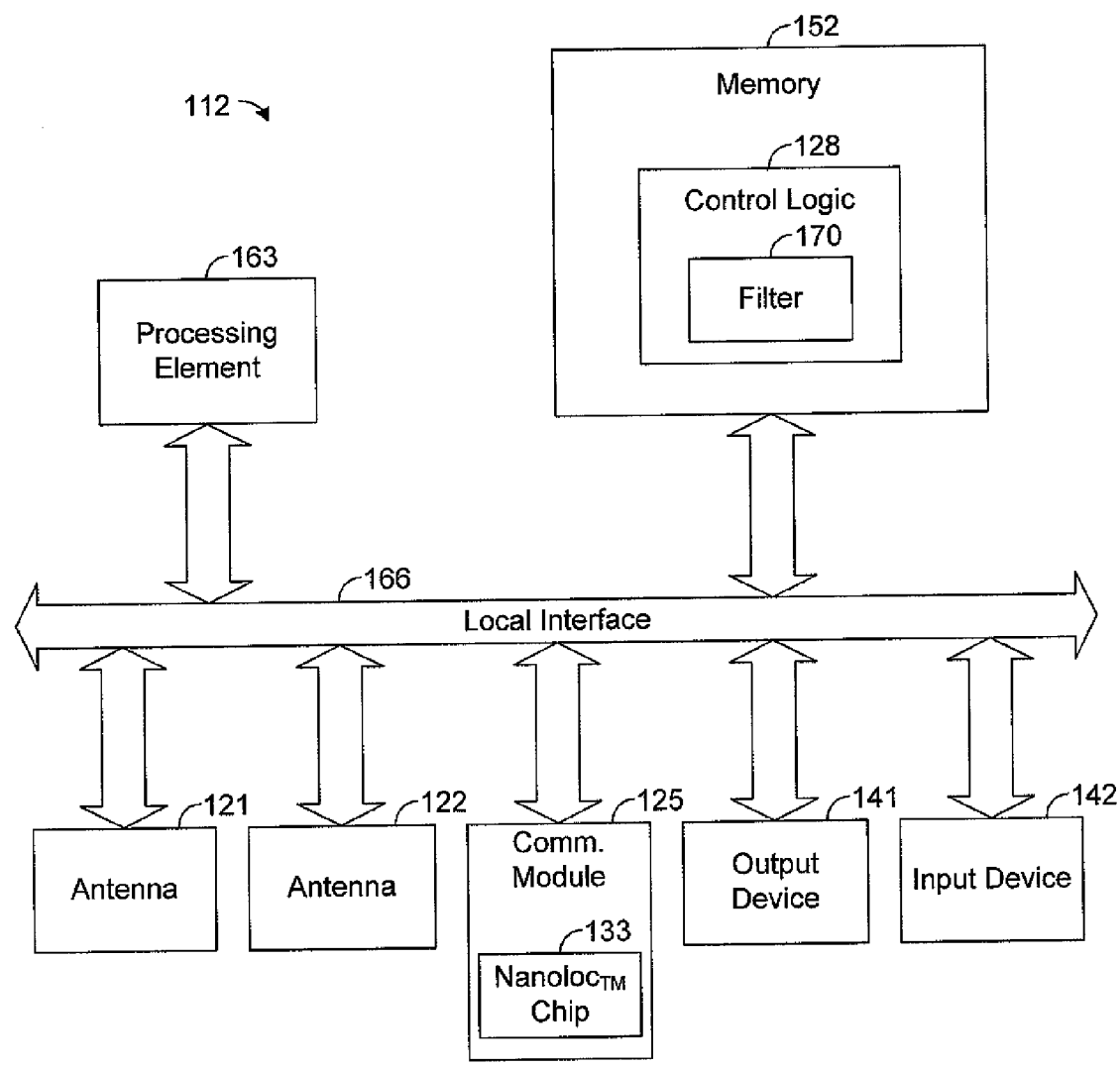
FIG. 6 is a block diagram illustrating an exemplary embodiment of a base, such as is depicted by FIG. 5.

The exemplary embodiment of the base 112 depicted by FIG. 6 comprises at least one conventional processing element 163, such as a digital signal processor (DSP) or a central processing unit (CPU), that communicates to and drives the other elements within the base 112 via a local interface 166, which can include at least one bus.

The base 112 is configured to measure the distance to the tag 15 according to techniques similar to those described above for any of the nodes 12-14. In this regard, the Nanoloc™ chip 133 determines at least one distance measurement value indicating a measured distance between the base 112 and the tag 15. If more than one distance measurement value is determined for a given distance measurement sample, the control logic 128 is configured to select the lowest distance measurement value and use this value for the sample. In the instant embodiment with only the base 112 being used to determine the position of the tag 15, each position sample is a one-dimensional range value representing the distance of the tag 15 from the base 112.

If there is no filtering or if filtering is disabled, then the selected distance measurement value is the range value represents a one-dimensional position sample indicating the tag's current distance from the base 112. However, in one exemplary embodiment, as shown by FIG. 6, the control logic 128 defines a filter 170 that is used to filter the distance measurement values. In particular, the filter 170 is a Kalman filter that employs a filtering algorithm as described above, but other types of filters may be implemented in other embodiments, if desired.

An exemplary operation of the control logic 128 in providing estimates of the range of the tag 15 will now be described in more detail below with particular reference to FIG. 7.

For illustrative purposes, assume that the base 112 provides four distance measurement values for each distance measurement sample. In particular, the Nanoloc™ chip 133 measures one distance measurement value using antenna 121 of the base 112 and antenna 41 (FIG. 3) of the tag 15. Note that each message communicated between the base 112 and the tag 15 for such measurement may include a unique identifier, referred to as the "antenna identifier," that is used by the base 112 and tag 15 to determine which antenna is to be used to receive the message. For example, a message transmitted by the base 112 may be detected via both antennas 41, 42 of the tag 15. However, based on the antenna identifier, the tag 15 is configured to ignore or discard the message received via the unidentified antenna and further process the message received via the identified antenna. Similar techniques may be used to control which antennas are to be used for determining a particular distance measurement value.

In addition to determining a distance measurement value via antennas 121, 41, the Nanoloc™ chip 133 also measures a distance measurement value using antenna 121 of the base 112 and antenna 42 (FIG. 3) of the tag 15. Further, the Nanoloc™ chip 133 measures a distance measurement value using antenna 122 of the base 112 and antenna 41 (FIG. 3) of the tag 15, and the Nanoloc™ chip 133 measures a distance measurement value using antenna 122 of the base 112 and antenna 42 (FIG. 3) of the tag 15. Thus, the Nanoloc™ chip 133 determines a distance measurement value for each possible combination of the antennas 41, 42, 121, 122. In other embodiments, other numbers of antennas and/or other numbers of distance measurement values for each distance measurement sample are possible.

As used hereafter, the term "antenna path" for a signal refers to the antennas that used to communicate the signal from a source to a destination. For example, if a signal is transmitted via antenna 121 and received by antenna 21, the signal's antenna path includes antennas 21 and 121 but not antennas 22 and 122.

Figure 7:
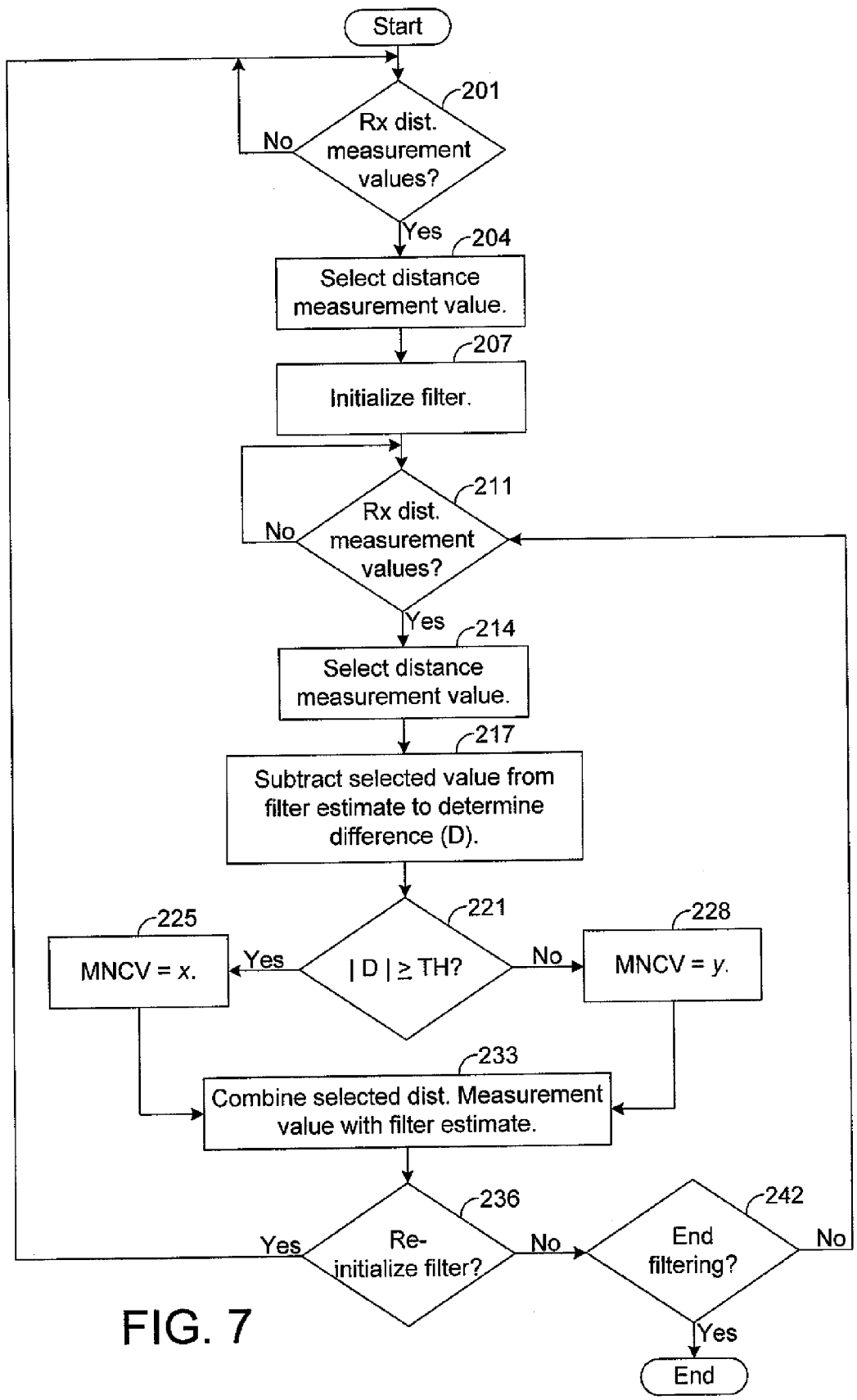
FIG. 7 is a flow chart illustrating an exemplary method for estimating a range between a base, such as depicted by FIG. 5, and a tag, such as is depicted by FIG. 3.

As shown by block 201 of FIG. 7, the control logic 128 determines when all four distance measurement values for a given distance measurement sample have been received from the communication module 125. For illustrative purposes, assume that there is a distance measurement value for each possible antenna path. Thus, for four antenna paths as described for the instant embodiment, there are four distance measurement values for each sample, but other numbers of distance measurement values per sample are possible in other embodiments.

As shown by block 204 of FIG. 7, once all four distance measurement values are received, the control logic 128 selects one of the distance measurement values for use in the filtering algorithm. In one exemplary embodiment, the control logic 128 selects the lowest distance measurement value, which is likely the most accurate. In this regard, the signals transmitted between the base 112 and tag 15 for determining the range of tag 15 may pass through obstructions, such as walls, trees, or other objects. Passing through an obstruction slows the message thereby increasing its time-of-flight. Thus, signals that have shorter time-of-flights have generally passed through less obstructions and are more accurate. In addition, signals may reflect from objects and be received by either the base 112 or the tag 15. A reflection generally travels a greater distance and, therefore, has a greater time-of-flight than a signal that is communicated directly between the tag 15 and base 112 without reflection. Selection of the lowest distance measurement value is based on the assumption that a lower distance measurement value, which indicates a shorter distance, for the same position sample is more accurate.

As shown by block 207 of FIG. 7, the control logic 128 initializes the filter 170 based on the selected distance measurement value. For illustrative purposes, assume hereafter that the filter 170 implements a Kalman filter, although other types of filters may be implemented in other embodiments. In one exemplary embodiment, the control logic 128 stores the selected distance measurement value in a memory location (e.g., a register) where the filter estimate maintained by the filter 170 is stored thereby initializing the filter estimate to the selected distance measurement value. The control logic 128 also initializes the PNCV to a predefined value, such as 0.1.

As shown by block 211 of FIG. 7, the control logic 128 determines when all four distance measurement values for the next distance measurement sample have been received from the communication module 125. As shown by block 214 of FIG. 7, once all four such values are received, the control logic 128 selects one of the distance measurement values for use in the filtering algorithm. In one exemplary embodiment, the control logic 128 selects the lowest distance measurement value, which is likely the most accurate. This selected value shall be referred to hereafter as the "current sample value." The control logic 128 subtracts the current sample value from the filter estimate, which was initialized in block 207, to determine a difference (D), as shown by block 217 of FIG. 7. Such difference indicates the change in the measured range of the tag 15 since the last estimate.

As shown by block 221 of FIG. 7, the control logic 128 compares the absolute value of the difference determined in block 217 to a predefined threshold (TH). In one exemplary embodiment, the distance measurement values are expressed in meters and the threshold is 4.0, but other measurement units and/or other thresholds are possible in other embodiments.

As shown by block 225 of FIG. 7, if the absolute value of the difference is greater than or equal to the threshold, the control logic 128 associates the current sample value with an MNCV of x, which is a predefined number. In one exemplary embodiment, x is equal to 4.0 but other numbers for x are possible in other embodiments. However, as shown by block 228 of FIG. 7, if the absolute value of the difference is less than the threshold, the control logic 128 associates the current sample value with an MNCV of y, which is a predefined number less than x indicating that the confidence in the current sample value is higher than would be indicated by x. In this regard, a lower MNCV indicates that the associated current sample value is estimated to be subject to less measurement noise and is, therefore, more accurate than a sample value associated with a higher MNCV. In one exemplary embodiment, the value of y is equal to 0.1, but other numbers for y are possible in other embodiments.

After the control logic 128 has established the MNCV for the current sample value, the filter 170 combines the current sample with the filter estimate, thereby updating the filter estimate, based on the PNCV and the MNCV associated with the current sample value, as shown by block 233 of FIG. 7. The updated filter estimate represents the estimate of the tag's range for the current sample.

As shown by block 236 of FIG. 7, the control logic 128 determines whether the filter 170 is to be re-initialized. Such a decision could be based on a variety of factors. For example, as described above, it may be desirable to reinitialize the filter 170 once a predefined level of motion of the tag 15 has been detected. Alternatively, if the control logic 128 determines that the filter estimate is erroneous, it may be desirable to re-initialize the filter 170. In yet other examples, the filter 170 can be re-initialized based on other factors.

If the filter 170 is to be re-initialized, the control logic 128 returns to block 201, as shown by FIG. 7. If not, control logic 128 determines whether the filtering is to be stopped. Such a decision may be based on various factors, such as the motion of the tag 15 or an input indicating that the base 112 is to be powered down. Such a decision may also be based on a comparison of the filter estimate to a threshold or otherwise based on the filter estimate. If the filtering is to be stopped, then the process shown by FIG. 7 ends. Otherwise, the control logic 128 returns to block 211, and the process is repeated for the next sample. In particular, a new distance measurement value is selected as the current sample value and is assigned a new MNCV based on a comparison of the current sample value to the filter estimate that was previously updated in block 233. Based on the new MNCV, the current sample value is combined with the foregoing filter estimate thereby updating such filter estimate and providing a new estimate of the tag's range.

The local positioning systems described herein, including the base 112 and tag 15 arrangement, can be used to track various types of assets (e.g., objects or personnel). In any wireless communication system, obstacles can block and/or attenuate wireless signals such that there are certain zones, referred to as "dead zones" in which adequate reception of the wireless signals does not occur In one exemplary embodiment, the base 112 is configured to detect when the tag 15 is entering a dead zone so that some desired action may be taken. For example, the base 112 may communicate a command or some other signal to the tag 15 for causing the tag's operation to change in the dead zone or at the boundary of the dead zone.

By using at least two differently positioned antennas 41, 42 for the tag 15, as described above, it is likely that one of the antennas 41, 42 will enter the dead zone before the other antenna 41, 42. The communication module 125 is configured to determine when communication via one of the antennas 41, 42 has been lost. In one exemplary embodiment, such a determination is made when the tag 15 fails to respond to one or more messages identifying the antenna within a specified time period.

As an example, assume that the tag 15 begins entering a dead zone such that the antenna 41 enters the dead zone before the antenna 42. In such a situation, communication via the antenna 41 stops once the antenna 41 enters the dead zone. The communication module 125 of the base 112 is configured to determine when communication with the antenna 41 has stopped. In one exemplary embodiment, the communication module 125 makes such a determination when the communication module 125 does not successfully receive replies from the antenna 41 for a predefined time period.

As described above, in at least one exemplary embodiment, the base 112 calculates a distance measurement value for each possible antenna combination between the base 112 and the tag 15. Thus, when there are two antennas 121, 122 at the base 112 and two antennas 41, 42 at the tag 15, there are four possible antenna paths and, therefore, for distance measurement values calculated for each distance measurement sample. Then, one of the distance measurement values is selected (e.g., the lowest) for further processing. In such an embodiment, it is possible for an antenna 41 or 42 of the tag 15 to move far enough into the dead zone such that communication between this antenna 41 or 42 and one of the antennas 121 or 122 of the base 112 is lost while the antenna 41 or 42 is still able to communicate with the other antenna of the base 112. Indeed, as the tag 15 moves into the dead zone it is likely that the four antenna paths will go down sequentially. For example, communication between antennas 121 and 41 may be lost first, and communication between antennas 122 and 41 may be lost next. Then, communication between antennas 121 and 42 may be lost, and communication between antennas 122 and 42 may be lost last.

In one exemplary embodiment, the control logic 128 determines the number of antenna paths that provided a valid distance measurement value for each distance measurement sample. The control logic 128 then averages or otherwise combines the number of valid distance measurement values per position sample for a plurality of the most recent distance measurement samples, and determines whether the tag 15 is entering a dead zone based on the averaged or otherwise combined numbers.

To better illustrate the foregoing, an exemplary operation of the system 252 in determining whether the tag 15 is entering a dead zone will now be described in detail below with particular reference to FIG. 8.

In this regard, for illustrative purposes assume that the base 112 has two antennas 121, 122 and that the tag 15 has two antennas 41, 42. Also assume that four distance measurement values using all four antenna paths are measured for each distance measurement sample. As shown by block 505 of FIG. 8, the control logic 128 determines when all four distance measurement values for a given position sample have been received. As shown by block 509, once all four distance measurement values have been received, the control logic 128 determines the number of the four distance measurement values that are valid. There are various techniques that can be used to determine whether a distance measurement value is valid. In one exemplary embodiment, the decision is based on whether the value is positive or negative.

In this regard, the Nanoloc™ chip 133 is configured to output a negative value when it encounters a problem in determining a distance measurement value. For example, as described above, each distance measurement value is calculated based on an average of two time-of-flight measurements. One time-of-flight measurement is based on a signal transmitted from the base 112 and a reply transmitted from the tag 15. The other is based on a signal transmitted from the tag 15 and a reply transmitted from the base 112. If the difference of these two time-of-flight measurements is above a threshold, then the Nanoloc™ chip 133 outputs a negative value. Moreover, losing communication with an antenna used to determine a distance measurement value will likely cause the Nanoloc™ chip 133 to output a negative value for such measurement. Thus, the control logic 128 is configured to determine that an invalid distance measurement value has been received when its value is below zero. The control logic 128 determines that the distance measurement value is valid if it is greater than or equal to zero. In other embodiments, other techniques for determining whether a distance measurement value is valid may be used.

After determining the number of valid distance measurement values received for the current sample, the control logic 128 combines (e.g., sums) the number of valid distance measurement values received for the last n number of distance measurement samples, inclusive of the current sample. In general, n is a predefined number (e.g., 10 with a position sample occurring every 100 ms). Thus, the control logic 128 determines a sum (a) of the number of valid distance measurement values received by the control logic 128 over the last n distance measurement samples that have occurred.

Figure 8:
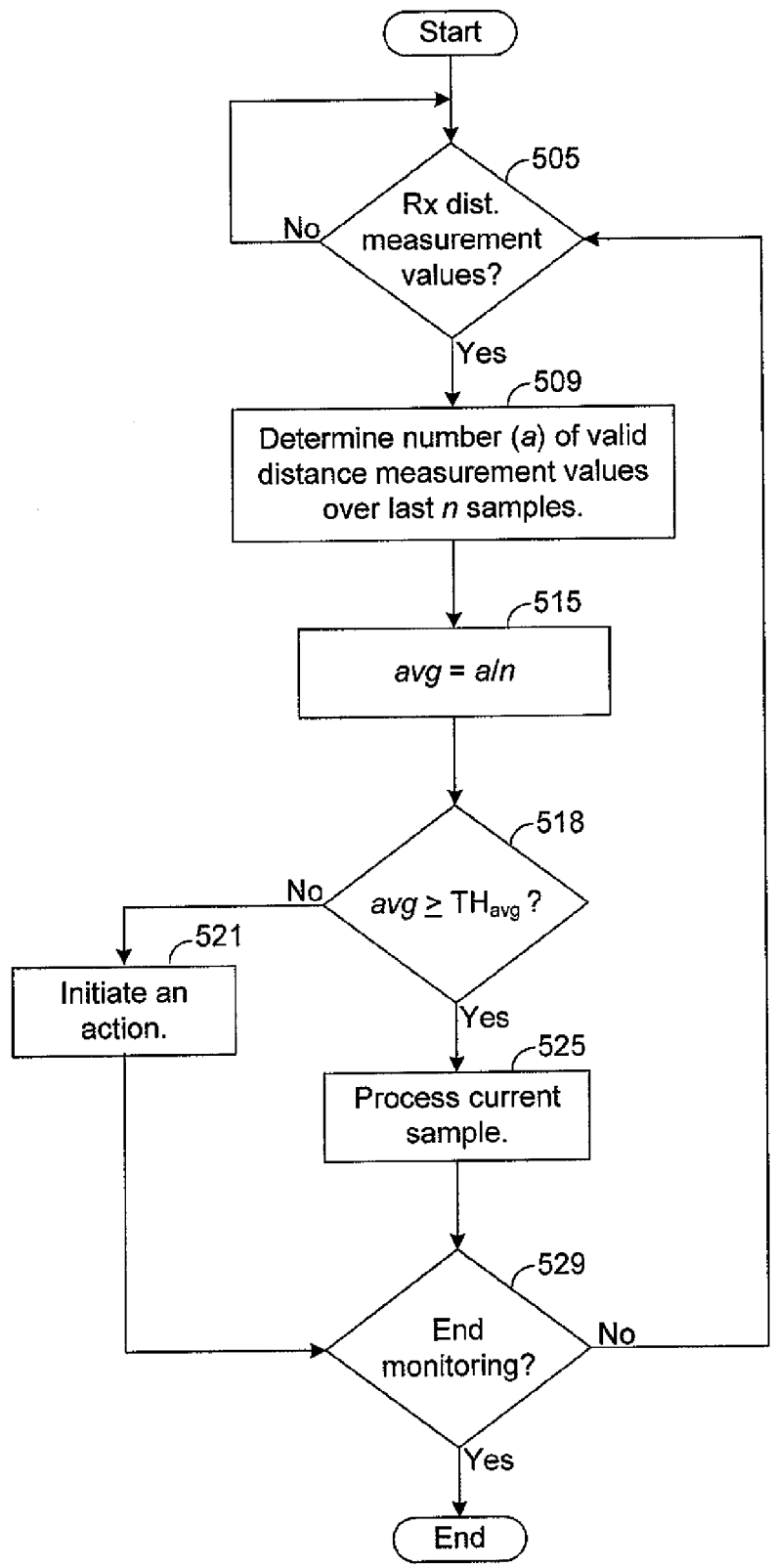
FIG. 8 is a flow chart illustrating an exemplary method for determining when a tag, such as is depicted by FIG. 3, is entering a dead zone.

After calculating a, the control logic 128 determines the average number (avg) of valid distance measurement values received per sample for the last n number of distance measurement samples, as shown by block 515 of FIG. 8. This may be determined by calculating (a/n). This calculated average is then compared to a threshold ($TH_{avg}$), as shown by block 518 of FIG. 8. In one exemplary embodiment, the threshold is equal to 1.5, but other values for the threshold are possible in other embodiments. If the calculated average falls below the threshold, then a sufficient number of the antenna paths have been unable to provide a valid distance measurement value over the last n distance measurement samples such that it can be assumed that the tag 15 is entering a dead zone. Thus, the control logic 128 initiates an action, as shown by block 521 of FIG. 8, in response to detection of entry into a dead zone. If the calculated average is equal to or greater than the threshold, then the control logic 128 determines that the tag 15 is not in and is not entering a dead zone. Thus, the control logic 128 processes the distance measurement values of the current distance measurement sample, as shown by block 525 of FIG. 8. For example, as described above, the control logic 128 may select one of the distance measurement values and then filter this selected value to provide an estimated range of the tag 15 from the base 112. As shown by block 529 of FIG. 8, the control logic 128 determines whether to end monitoring and returns to block 505 if monitoring is to continue.

It should be noted that selection of n is a design parameter that controls the responsiveness of the system 252 in determining entry into a dead zone. In this regard, decreasing n generally increases the system's responsiveness (i.e., detects entry in a shorter amount of time) but also increases the probability of making a false entry determination. However, the probability of the tag 15 entering a dead zone without detection is decreased. Increasing n generally decreases the system's responsive (i.e., takes longer to detect entry) but may also increases the probability of making a false entry determination. However, the probability of the tag 15 entering a dead zone without detection is increased depending on how quickly the tag 15 is moving.

In one exemplary embodiment, once the control logic 128 determines that the tag 15 has entered a dead zone, the control logic 128 determines when the tag 15 exits the dead zone via similar techniques. For example, the same method shown by FIG. 8 may be used except that a determination is made in block 518 that the tag 15 is leaving the dead zone when the average (avg) is greater than equal to the threshold. In this regard, as the tag 15 is leaving the dead zone, it is likely that antenna paths will come up (e.g., enable communication) sequentially much like the antenna paths go down (stop communicating) sequentially when the tag 15 is entering the dead zone, as described above. To provide hysteresis, the threshold used to determine when the tag 15 is exiting a dead zone may be different (e.g., larger) than the threshold used to determine when the tag 15 is entering a dead zone. In one exemplary embodiment, the threshold used to determine when the tag 15 is entering a dead zone is 1.5 (assuming that there are four antenna paths, as described above), and the threshold used to determine when the tag 15 is exiting a dead zone is 1.9. However, other thresholds may be used in other embodiments.

Various embodiment described have a Nanoloc™ chip for determining range information. It should be emphasized that using a Nanoloc™ is unnecessary, and other types of components and other types of ranging algorithms may be used to estimate range in any of the embodiments described herein.

The invention claimed is:

1. A local positioning system, comprising:
at least one node configured to track a mobile tag, the at least one node configured to determine a plurality of sample values, each of the sample values indicative of a respective location of the tag relative to the at least one node and based on at least one signal communicated with the tag, the at least one node having a filter configured to combine the sample values via a filtering algorithm thereby providing an estimate indicative of a current location of the tag, the at least one node further configured associate each of the sample values with a respective one of a plurality of filter parameter values, the one filter parameter value indicative of a confidence in the associated sample value,
wherein the filtering algorithm is based on the filter parameter values associated with the sample values, wherein for one of the sample values the at least one node is configured to perform a comparison between the one sample value and an estimate indicative of a previous location of the tag, and wherein the filter parameter value associated with the one sample is based on the comparison.

2. The system of claim 1, wherein the filter is a Kalman filter.

3. The system of claim 1, wherein the tag comprises a motion sensor, and wherein the at least one node is configured to update the filter based on the motion sensor.

4. The system of claim 1, wherein the tag has a plurality of antennas.

5. The system of claim 1, wherein the filter is configured to weight each of the sample values in the filtering algorithm based on the associated filter parameter value.

6. The system of claim 1, wherein each of the sample values is based on at least one measured time-of-flight value for at least one signal communicated with the tag.

7. The system of claim 1, wherein the at least one node is configured to determine a difference between the one sample value and the estimate indicative of the previous location and to compare the difference to a threshold, and wherein the filter parameter value associated with the one sample is a based on a comparison of the difference to the threshold.

8. A local positioning system, comprising:
at least one node configured to track a mobile tag, the at least one node configured to determine a plurality of sample values, each of the sample values indicative of a respective location of the tag relative to the at least one node and based on at least one signal communicated with the tag, the at least one node having a filter configured to combine the sample values via a filtering algorithm thereby providing an estimate indicative of a current location of the tag, the at least one node further configured associate each of the sample values with a respective one of a plurality of filter parameter values, the one filter parameter value indicative of a confidence in the associated sample value,
wherein the filtering algorithm is based on the filter parameter values associated with the sample values, wherein the at least one node is configured to perform a comparison between a threshold and a value indicative of a sensed movement of the tag, and wherein the at least one node is configured to update the filter based on the comparison.

9. The system of claim 8, wherein each of the sample values is based on at least one measured time-of-flight value for at least one signal communicated with the tag.

10. A local positioning system, comprising:
at least one node configured to track a mobile tag, the at least one node configured to determine a plurality of sample values, each of the sample values indicative of a respective location of the tag relative to the at least one node and based on at least one signal communicated with the tag, the at least one node having a filter configured to combine the sample values via a filtering algorithm thereby providing an estimate indicative of a current location of the tag, the at least one node further configured associate each of the sample values with a respective one of a plurality of filter parameter values, the one filter parameter value indicative of a confidence in the associated sample value,
wherein the filtering algorithm is based on the filter parameter values associated with the sample values, wherein the at least one node, for one of the sample values, is configured to determine a plurality of distance measurement values, each of the plurality of distance measurement values indicative of a measured distance between the at least one node and the tag, and wherein the at least one node is configured to perform a comparison of the plurality of distance measurement values and to select, based on the comparison, one of the distance measurement values as the one sample value to be filtered by the filter.

11. The system of claim 10, wherein selection of the one distance measurement value as the one sample value is in response to a determination that the one distance measurement value indicates a shorter distance between the at least one node and the tag relative to each of the other plurality of distance measurement values.

12. The system of claim 10, wherein each of the plurality of distance measurement values is indicative of a measured distance between the at least one node and the tag via a different antenna path.

13. The system of claim 10, wherein each of the sample values is based on at least one measured time-of-flight value for at least one signal communicated with the tag.

14. A local positioning system, comprising:
at least one node configured to track a mobile tag, the at least one node configured to determine a plurality of sample values, each of the sample values indicative of a respective location of the tag relative to the at least one node and based on at least one signal communicated with the tag, the at least one node having a filter configured to combine the sample values via a filtering algorithm thereby providing an estimate indicative of a current location of the tag, the at least one node further configured associate each of the sample values with a respective one of a plurality of filter parameter values, the one filter parameter value indicative of a confidence in the associated sample value,
wherein the filtering algorithm is based on the filter parameter values associated with the sample values, wherein the at least one node is configured to determine a value indicative of a number of lost antenna paths between the at least one node and the tag, and wherein the at least one node configured to determine whether the tag is in a dead zone based on the value indicative of the number of lost antenna paths.

15. The system of claim 14, wherein the at least one node is configured to perform a comparison between a threshold and the value indicative of the number of lost antenna paths, and wherein the at least one node is configured to determine whether the tag is in the dead zone based on the comparison.

16. The system of claim 14, wherein each of the sample values is based on at least one measured time-of-flight value for at least one signal communicated with the tag.

17. A local positioning method, comprising the steps of:
 determining a plurality of sample values, each of the sample values indicative of a respective location of a mobile tag and based on at least one signal communicated with the tag;
 associating each of the sample values with a respective one of a plurality of filter parameter values, the one filter parameter value indicative of a confidence in the associated sample value;
 comparing one of the sample values and an estimate indicative of a previous location of the tag;
 determining the filter parameter value associated with the one sample value based on the comparing step;
 filtering the sample values thereby providing an estimate indicative of a current location of the tag, wherein the filtering step comprises the step of combining the sample values via a weighted filtering algorithm based on the associated filter parameter values; and
 storing the estimate in memory.

18. The method of claim 17, wherein the filtering step comprises the step of weighting each of the sample values based on the associated filter parameter values.

19. The method of claim 17, wherein each of the sample values is based on at least one measured time-of-flight value for at least one signal communicated with the tag.

20. The method of claim 17, further comprising the steps of:
 determining a difference between the one sample value and the estimate indicative of the previous location;
 comparing the difference to a threshold,
 wherein the determining step is based on the comparing the difference to the threshold step.

21. A local positioning method, comprising the steps of:
 determining a plurality of sample values, each of the sample values indicative of a respective location of a mobile tag and based on at least one signal communicated with the tag;
 associating each of the sample values with a respective one of a plurality of filter parameter values, the one filter parameter value indicative of a confidence in the associated sample value;
 filtering the sample values thereby providing an estimate indicative of a current location of the tag, wherein the filtering step comprises the step of combining the sample values via a weighted filtering algorithm based on the associated filter parameter values;
 storing the estimate in memory;
 determining a plurality of distance measurement values, each of the plurality of distance measurement values indicative of a respective location of the tag;
 comparing the plurality of distance measurement values; and
 selecting, based on the comparing step, one of the plurality of distance measurement values as one of the sample values to be filtered in the filtering step.

22. The method of claim 21, wherein the selecting step is in response to a determination that the one distance measurement value indicates a shorter distance to the tag relative to each of the other plurality of distance measurement values.

23. The method of claim 21, wherein each of the plurality of distance measurement values is indicative of a measured distance to the tag via a different antenna path.

24. The method of claim 21, wherein each of the sample values is based on at least one measured time-of-flight value for at least one signal communicated with the tag.

25. A local positioning method, comprising the steps of:
 determining a plurality of sample values, each of the sample values indicative of a respective location of a mobile tag and based on at least one signal communicated with the tag;
 associating each of the sample values with a respective one of a plurality of filter parameter values, the one filter parameter value indicative of a confidence in the associated sample value;
 filtering the sample values thereby providing an estimate indicative of a current location of the tag, wherein the filtering step comprises the step of combining the sample values via a weighted filtering algorithm based on the associated filter parameter values;
 storing the estimate in memory;
 determining a value indicative of a number of lost antenna paths for the tag; and
 determining whether the tag is in a dead zone based on the value indicative of the number of lost antenna paths.

26. The method of claim 25, further comprising the step of comparing a threshold and the value indicative of the number of lost antenna paths, wherein the determining whether the tag is in the dead zone step is based on the comparing step.

27. The method of claim 25, wherein each of the sample values is based on at least one measured time-of-flight value for at least one signal communicated with the tag.

* * * * *